(12) United States Patent
Merwin

(10) Patent No.: US 6,904,800 B2
(45) Date of Patent: Jun. 14, 2005

(54) LOW-WATER CUT-OFF SYSTEM

(75) Inventor: Jeffrey Merwin, St. Charles, MO (US)

(73) Assignee: Potter Electric Signal Company, St. Louis, MO (US)

(*) Notice: Subject to any disclaimer, the term of this patent is extended or adjusted under 35 U.S.C. 154(b) by 0 days.

(21) Appl. No.: 10/154,730

(22) Filed: May 24, 2002

(65) Prior Publication Data

US 2002/0175822 A1 Nov. 28, 2002

Related U.S. Application Data

(60) Provisional application No. 60/293,444, filed on May 24, 2001.

(51) Int. Cl.[7] .............................................. G01F 23/00
(52) U.S. Cl. .................... 73/304 R; 73/304 R; 73/292; 340/620
(58) Field of Search ............................. 73/304 R, 292; 340/620

(56) References Cited

U.S. PATENT DOCUMENTS

| | | | | |
|---|---|---|---|---|
| 3,207,282 A | * | 9/1965 | Norris, Jr. .................... | 194/220 |
| 3,824,372 A | * | 7/1974 | Eaton ........................... | 392/326 |
| 4,027,172 A | * | 5/1977 | Hamelink .................. | 73/304 R |
| 4,263,587 A | * | 4/1981 | John ........................ | 73/304 R |
| 4,343,987 A | * | 8/1982 | Schimbke et al. ........... | 392/312 |
| 4,639,718 A | | 1/1987 | Gasper ....................... | 340/603 |
| 4,687,997 A | * | 8/1987 | Tao ............................. | 324/439 |
| 4,888,097 A | * | 12/1989 | Palmer et al. ................. | 203/1 |
| 4,985,696 A | | 1/1991 | Beomont .................... | 340/618 |
| 5,027,075 A | | 6/1991 | Harding, Jr. ................. | 324/662 |
| 5,111,691 A | | 5/1992 | John et al. ..................... | 73/292 |
| 5,210,769 A | | 5/1993 | Seidel et al. .................. | 73/295 |
| 5,216,288 A | | 6/1993 | Greene ......................... | 307/118 |
| 5,304,852 A | | 4/1994 | Hiraga et al. ................ | 307/118 |
| 5,446,444 A | | 8/1995 | Lease .......................... | 340/514 |
| 5,519,639 A | * | 5/1996 | Jordan et al. ............. | 73/290 R |
| 5,553,494 A | | 9/1996 | Richards ....................... | 73/304 |
| 5,565,851 A | | 10/1996 | Richards et al. ............ | 340/612 |
| 5,775,164 A | | 7/1998 | Kishi .......................... | 73/304 |
| 5,992,231 A | | 11/1999 | Mulder et al. ................ | 73/304 |
| 6,154,144 A | * | 11/2000 | Johnson ..................... | 340/620 |

OTHER PUBLICATIONS

Product Information Brochure, MERLI ™ Drum Level Monitor, Diamond Power Specialty Company, Dated Jan. 1995.

* cited by examiner

*Primary Examiner*—Hezron Williams
*Assistant Examiner*—André K. Jackson
(74) *Attorney, Agent, or Firm*—Ari M. Bai; Greensfelder, Hemker & Gale, P.C.

(57) ABSTRACT

A low-water cut-off system [A] determines if fluid [W] within a boiler [16] or other enclosure drops below a predetermined level within the enclosure. A signal generator introduces a signal into the enclosure so that the signal is present for sensing at the predetermined level, where a probe [14] is provided for sensing the signal if present as occurs if the water is at the predetermined level. A control [18], which includes a microcontroller [25], is responsive to the probe for providing a control function in response to whether the signal is so sensed by the probe, and so to determine if water has dropped below the predetermined level. The function may be causing alarm signalling or boiler heating cut-off. Self-test and time delay features are also included. Provision is made so that the control compensates for variation in electrical conductivity of the water through which the probe signal is sent.

18 Claims, 3 Drawing Sheets

LOW-WATER CUT-OFF SYSTEM

This application claim benefit of Provisional No. 60/293,444, filed May 24, 2001.

BACKGROUND OF THE INVENTION

1. Field of the Invention

The present invention relates to fluid level detection systems and, more particularly, to an advantageous low-water cut-off system that operates in any of a wide range of conditions and provides precise level detection with an extraordinarily wide variety of electrically conductive fluids.

Although the term low water cut-off system is herein used, it will be understood as being applicable to systems using fluids other than water which exhibit electrical conductivity that can be sensed for the present purposes. The term low water cut-off system is used in its general sense, regardless of the fluid to be sensed.

2. Known Art

Low water cut-off systems have long been used in low-pressure and hot water boilers to cut off a burner for the boiler if there is a low water level (or other low fluid level) condition. Such low water cut-off systems may be used either for primary or secondary protection. A wide variety of such low water cut-off systems have been known or proposed, based typically either on float level detection or on electrical conductivity of a fluid whose level is to be measured.

Among the challenges in the design of low water cut-off systems are the following requirements:

The system should be preferably adjustable to provide preselected delay in its make or break operation. For example, fluid level in a boiler may fluctuate during operation, causing a possibility of possibly spurious, inaccurate or premature operation. A preselected delay may accordingly be preferred before the low water cut-off system closes control contacts (delay on make operation). Further, in the event of operation of the low water cut-off system, and/or a preselected delay may be preferred before the low water cut-off system opens control contacts (delay on break operation).

Moreover, the nature of the fluid (such as water in a boiler system) may be different from one installation to the next, being dependent, for example on impurities or additives in the fluid. Electrical conductivity of the fluid to be sensed by the low water cut-off system may be subject to a wide possible range of purity levels of the water disposed in the boiler tank.

Because low water cut-off systems of the type operating according to electrical conductivity of water or other liquid require the fluid to be conductive in order to sense its presence, high purity water, which exhibits very low electrical conductivity, can fool the device into a false low water condition. Previously, individual or special models had to be offered to the industry to handle these pure water applications.

Accordingly, it is preferred that a low water cut-off system using a probe responsive to electrical conductivity be capable of adjustment in probe sensitivity; however the prior art has not provided a satisfactory low water cut-off system with suitable probe arrangement in which the probe is responsive to electrical conductivity. Preferably, the low water cut-off system operates under microprocessor control and is capable of ready, convenient adjustment in probe sensitivity over a suitable range.

In general, there is also a continuing need in the art for a low-water cut-off system that reliably prevents false or premature cut-off operation in the event of temporary changes or surges in fluid level. There is a further need in the art for a low-water cut-off system that allows selective easily-set control of both make and break times during operation, and that avoids spurious, inaccurate or premature operation of the system.

Within the art, there also is a general failure to teach a low water cut-off system which could allow for rapid and convenient adjustment of the conductivity level of the fluid with which the probe is used in order to account for the purity level of the water or other fluid in the boiler tank.

Finally, there is a need in the art for a low-water cut-off system that provides combinations of these features for use in a wide variety of low-pressure steam and hot water boilers, as well as the capability for being used in both manual and automatic reset modes.

Among the many patented low water cut-off system systems, none can be found that appears more pertinent or relevant than U.S. Pat. No. 5,111,691 to John et al. which discloses a low water cut off conductance probe and control system having a time delay feature. The probe combines temperature and electrical conductivity sensing operations. However, the time delay feature utilized in said John et al. reference is fixed such that the system cannot be adjusted by the user without changing out the particular hardware arrangement described in the reference. The time delay feature of that patent has an R-C (resistive-capacitance) charging circuit in combination with an analog timer device that turns on and off an output relay to the boiler when charged or discharged by the charging circuit. More specifically, when the probe permits current flow through water filling the tank of the boiler the charging circuit begins to cause charging of a capacitor of a timing circuit. After a fixed period of time, the capacitor voltage reaches a level to enable an analog timer device which in turn activates the boiler through an output relay. Conversely, when the water level drops below a predetermined level, the probe no longer senses the electrical charge and the charging circuit discharges the capacitor over a fixed period of time. When the charging circuit is fully de-energized the analog timer device turns off the boiler.

In contrast to the John et al. reference, the present invention provides a low water cut-off system having an adjustable time delay feature implemented by a microprocessor, rather than being part of a fixed hardware circuit arrangement as found in the John et al. reference.

In further contrast with said John et al. reference, the low water cut-off system of the present invention allows a user to simply set the preferred time delay for the system at the microprocessor in order to adjust the time delay. The John et al. reference does not teach nor suggest such an adjustable time delay system much less one which is microprocessor-implemented and readily adjustable in time delay as well as other operational parameters.

Moreover, the John et al. reference does not teach nor suggest the provision of the new low water cut-off system according to the present invention for setting or adjusting the probe conductivity to the purity level of the water or other fluid in a boiler.

OBJECTS AND SUMMARY OF THE INVENTION

Among the several objects, features and advantages of the invention may be noted the provision of an improved low water cut-off system which:

is responsive to electrical conductivity of water or other fluid used in a boiler or other device or system where fluid level must be sensed;

provides utility and precision as well as highly reliable operation both for low-pressure and hot water boilers to cut off a burner for the boiler if there is sensed a low water level (or other low fluid level) condition;

can be used either for primary or secondary protection;

has an adjustment feature that compensates for less conductive, pure water applications, and so provides a distinct advantage over prior low water cut-off systems in that the low water cut-off system of the present invention is capable of serving the industry as a single control which can cover a larger variety of water conditions;

can be used over a wide range of electrical conductivity values of fluid to be sensed by allowing selective adjustment for use in sensing a fluid with a known purity level, as when there are impurities or additives in the fluid;

uses a highly precise probe and electronic circuitry responsive to electrical conductivity, yet capable of adjustment precisely and easily in probe sensitivity;

reliably prevents false or premature cut-off operation in the event of temporary changes or surges in fluid level;

is microprocessor-based for solid state reliable and facile adjustment;

provides operation and different possible input supply voltages, such as preferably 120 VAC or 24 VAC;

operates with very low electrical power consumption;

permits different possible probe lengths;

can be used for either indoor or outdoor use;

can be used in hazardous locations as well as in remote locations;

allows selective easily-set control of both delay on make (DOM) and delay on break (DOB) times in operation;

avoids spurious, inaccurate or premature operation;

provides for fail-safe operation to prevent undesired lock out upon power loss;

includes features for assuring of reliable fault-free operation; and is capable of being specified for use in either manual and automatic reset modes.

In a general sense, the low water cut-off system of the present invention is an apparatus for determining the presence of a fluid at a predetermined level within a fluid-containing enclosure in which the fluid can rise to the predetermined level. The apparatus operates according to a method comprising the introduction, of a signal into the fluid-containing enclosure such that the signal is present for sensing within the fluid at the predetermined level, sensing for the presence of the signal within the fluid at the predetermined level, and providing a control function in response to whether the signal is so sensed, in order to indicate whether the fluid is present at the predetermined level.

In brief, it will be seen that the present invention relates to a low water cut-off system for determining whether the water has dropped below a predetermined level within the fluid-containing enclosure, wherein the system comprises:

a signal generator operative to introduce a signal into the fluid-containing enclosure such that the signal is present for sensing within the fluid at the predetermined level, a probe at the predetermined level capable of sensing the presence of the signal within the fluid if the fluid is at the predetermined level, and a control responsive to the probe sensing for providing a control function in response to whether the signal is so sensed by the probe in order to indicate whether the water has dropped below the predetermined level.

More specifically summarized, the low water cut-off system of the present invention is a microprocessor-based control system for detecting the presence of an electrically conductive fluid in a vessel or tank, such as a boiler. It includes a probe for signaling a low water condition in the boiler or other vessel or tank. The system is provided with an adjustable time delay feature for preventing rapid shuttling of the device between on and off conditions whenever the water level is fluctuating about the probe. It also includes a water purity feature that permits the user to change the conductance level of the probe in order to increase detection sensitivity when accounting for higher levels of water purity in the boiler in accordance with the electrical conductivity of the fluid. The system includes a housing containing electronic circuitry and the probe, which is operatively connected to the electronic circuitry and extends outwardly from a brass bushing carried by the housing. The electronic circuitry includes a microprocessor which permits the user to readily and easily adjust the time delay without having to change the hardware arrangement of the system. In operation, an electric current is applied to the device which flows through the housing and into the conductive fluid, such as water, that surrounds the housing. Whenever the fluid level is above the probe, the electric current flows through the conductive fluid and the probe. However, if fluid level falls below the probe, the probe no longer detects electric current generated by the device through the conductive fluid. An alarm signal is then transmitted to a remote site signaling the fact that a low fluid (low water) condition exists. Additionally, the system also shuts down the boiler whenever a low water condition continues to exist for a predetermined amount of time. The system permits preselected delay to set for either its or break operation.

Additional objects, advantages and novel features of the invention will be set forth in the description which follows or will become apparent to those skilled in the art upon examination of the drawings and detailed description which follow.

BRIEF DESCRIPTION OF THE DRAWINGS

Corresponding reference characters indicate corresponding elements among the views of the drawings.

DETAILED DESCRIPTION OF PRACTICAL EMBODIMENT(S)

Figure 1:
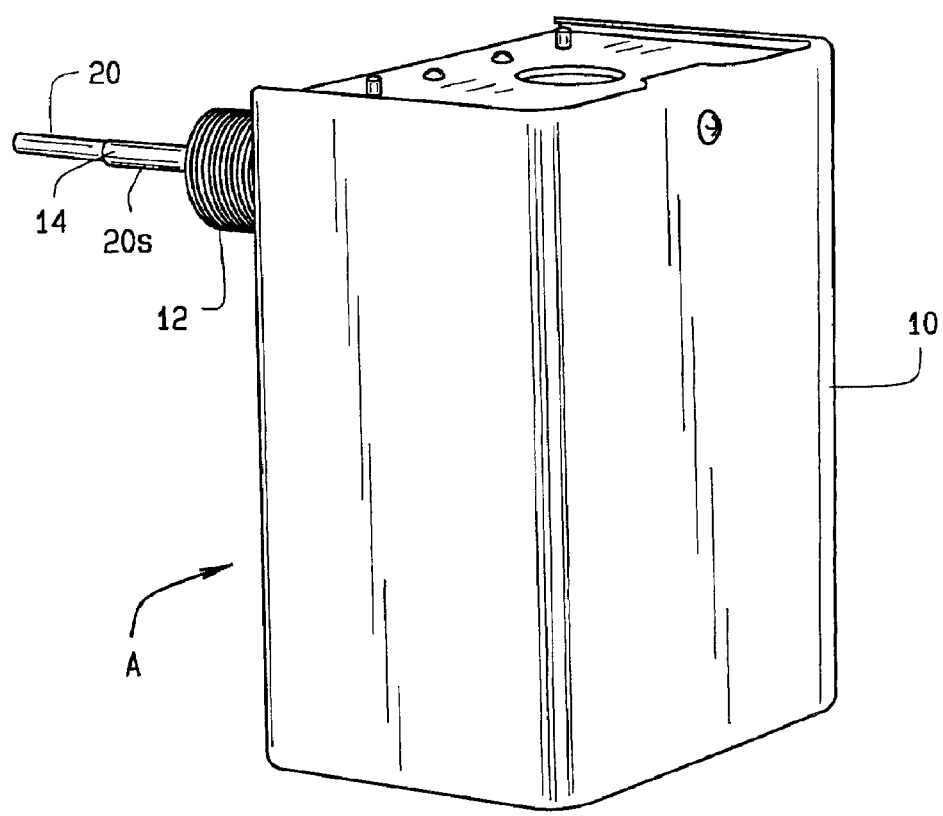
FIG. 1 is a schematic view of a low water cut-off system including water probe according to the present invention.

Referring to the drawings, one of the possible embodiments of the low water cut-off system according to the present invention is generally designated A in FIG. 1. Low water cut-off system A includes a housing 10 and a threaded fitting 12 from which extends an electrical probe 14 for testing the presence of liquid about probe 14. Fitting 12 may be threaded to a boiler, tank or other vessel (represented by dotted line as vessel 16 in FIG. 2) or other apparatus in which it is desired to sense the level of fluid W, such as water, or other liquid therein.

Probe 14, whether physically separate from (but interconnected with) circuitry 18, or as an integral part of housing 10, is installed into the tank or vessel at the predetermined level (indicated by the legend LEVEL in FIG. 2) at which fluid W is normally maintained. It will be understood by one of ordinary skill in the art that an alarm or cut-off or other appropriate corrective, warning or indicating action is taken if the fluid level drops below the level of probe 14, resulting from the operation of electronics 18 of the low water cut-off system A.

Figure 2:
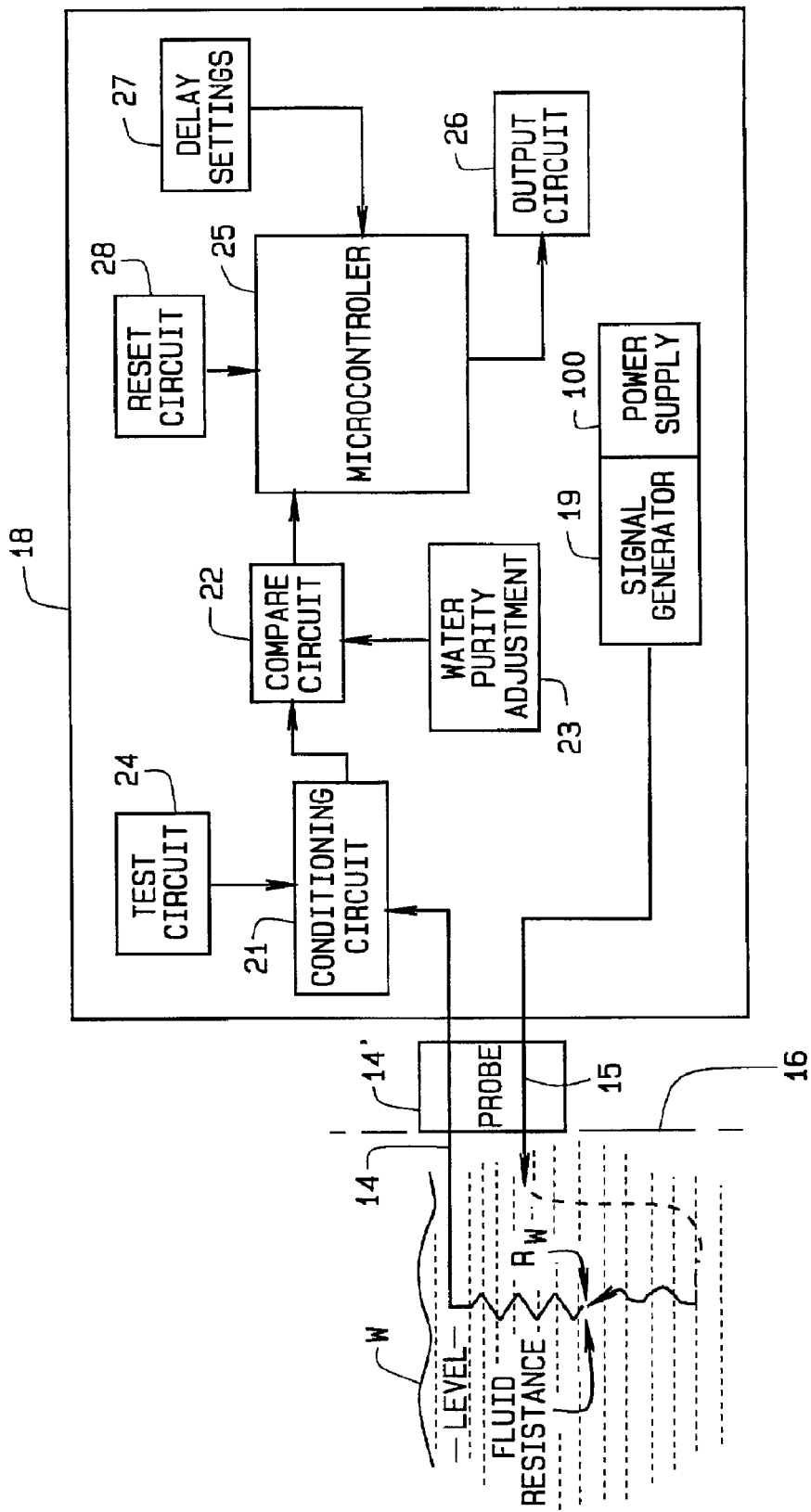
FIG. 2 is a block diagram of circuitry of the low water cut-off system according to the present invention.

Referring to FIG. 2, the electronic circuitry 18 of low water cut-off system A injects a periodic signal into the conductive fluid W contained inside a vessel or tank (not shown) and employs probe 14 to sense the signal as indicative of the presence of fluid W about probe 14. Probe 14 then is used to effectively detect for the signal by probing for its presence in such fluid W when so permitted by the electrical conductivity of fluid W about the probe 14. Even though fluid W is electrically conductive it may be subject to variations in its normal electrical conductivity as noted hereinabove. For example, the electrical conductivity is low in water of high purity, i.e., its resistance to electrical current is high. In operation, low water cut-off system A provides an adjustment that compensates for less conductive, pure water applications.

As is known in the art, the boiler may be conventionally fired by a burner (not shown) to be protectively controlled by low water cut-off system A. Housing 10 may be of the size shown, or may be larger or much smaller, and its circuitry either located in housing 10 or located remotely from the housing, but connected in any event to probe 14. Probe 14 is provided with an electrical conductive tip electrode portion 20 and an electrically insulating stand-off sleeve 20s, from which it will be shown that tip 20 provides electrical conductivity with fluid W.

General Operation.

Low water cut-off system A generates an AC signal and transmits the AC signal into fluid W contained within a tank or vessel. If the conductive fluid W covers the electrode in probe 14, the electronics in low water cut-off system A detect the presence of the AC signal. As long as fluid W covers the probe 14, the electronics energize a relay K1, which can be used to enable devices, such as boiler heating sources. When fluid W does not cover the electrode, low water cut-off system A detects the loss of the AC signal and de-energizes relay K1, which can subsequently disable devices, such as boiler heating sources, thereby preventing a dry fire or explosion.

Delay Operation.

In applications where short cycling of low water cut-off system A is undesirable, for example, when conditions are such that fluid W may only temporarily uncover probe 14 (as in the event of tank sloshing), programmable delay or delays may be enabled for low water cut-off system A. Thus low water cut-off system A may be configured to create a delay on make, DOM, and a delay on break, DOB. The DOM setting requires that low water cut-off system A detect fluid W covering probe 14 continuously for the specified delay setting. During the filling of a boiler with fluid W, this delay will prevent premature enabling of the heat source due to turbulence in fluid W. The DOB setting requires that low water cut-off system A detect a lack of fluid W continuously for the specified delay setting. In steam generation applications, the turbulence due to boiling will not cause premature disabling of the heat source if a DOB setting is enabled.

Specific Circuit Features and Operation.

Figure 3:
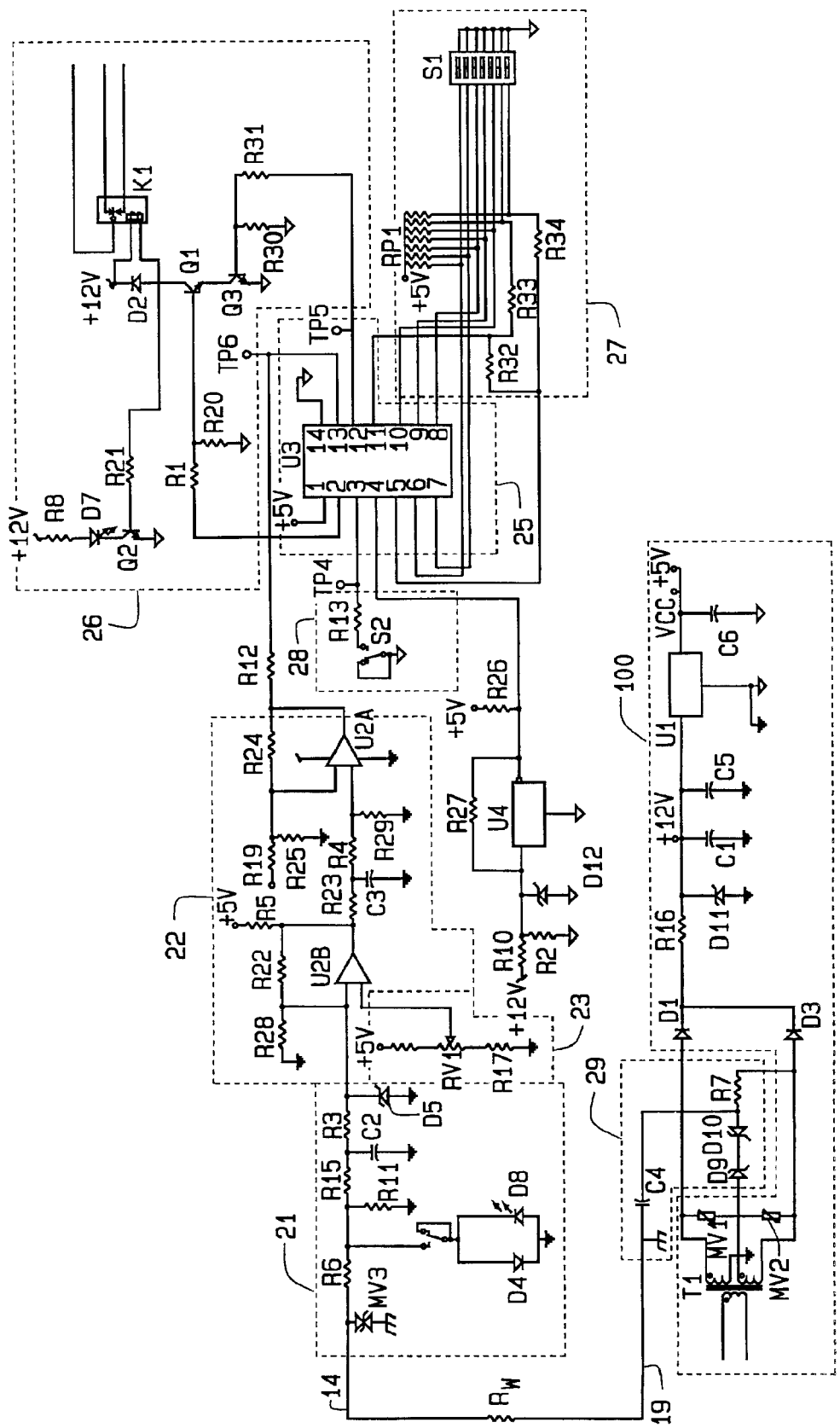
FIG. 3 is a schematic circuit diagram of the low water cut-off system according to the present invention.

Comparison of the block diagram of low water cut-off system A shown in FIG. 2 with the schematic circuit diagram of FIG. 3, illustrates both the specific features and specific operation of circuitry 18.

In FIG. 2, a block 14' schematically represents a functional connection for probe 14 and for a signal path 15 which includes a connection for providing a signal input to fluid W from a signal generator 19 associated with a power supply 100. As further shown, the intrinsic resistance of fluid W as sampled or tested by probe 14 is designated RW. Block 21 represents a conditioning circuit for probe 14. A compare circuit is shown by block 22. A water purity adjustment for the compare circuit 22 allows selective calibration of low water cut-off system A for taking into account differences in electrical conductivity of fluid W, and is represented by block 23. A test circuit is shown as block 24 to provide a test signal for conditioning circuit 21 for self-testing by low water cut-off system A.

Supervision and control of low water cut-off system A is carried out by a microcontroller shown as block 25, to which is operatively connected to an output circuit 26 for providing a control function output, e.g., for burner cut-off, or other control signalling or functioning which users may wish to make of low water cut-off system A. In other words, output circuit 26 provides a suitable control function in response to whether the level-determining signal is sensed by probe 14 in order to indicate whether fluid W has a level at least as high as the predetermined level at which probe 14 is located. The control function may be used for alarm or cut-off purposes if the fluid level shifts relative to the predetermined level, marked with the legend LEVEL in FIG. 3.

A reset circuit is shown as block 28 for resetting of low water cut-off system A through operation of the microcontroller 25 in accordance with delay settings established by a delay setting circuit represented by block 27.

Referring to FIG. 3, more specific circuit features will now be disclosed and their operation explained in greater detail. The circuitry 18 associated with conditioning circuit 21 includes circuit components which make up the conditioning circuitry that receives an AC signal conducted by any fluid W, such as water, that covers probe 14. If no fluid W covers probe 14, resistors R6, R11, and R15 will have no AC voltage applied to them. This allows R11 to pull the input of the comparator U2B in block 22 to a low level. Conversely, if fluid W covers probe 14, the AC voltage conducts through fluid N and appears on the resistors R6, R11, and R15, and in turn, drives the input of the compare circuit 22. Compare circuit 22 stage squares the AC signal and sets the pulse width of its output relative to the water purity adjustment level, potentiometer RV1. If the conductivity of fluid W is low enough, such pulsed output will have a pulse width large enough to charge capacitor C3 above the reference set by resistors R19 and R25. When this occurs, final comparator stage U2A will generate a low voltage on its output to the microcontroller 25.

When fluid W covers probe 14, microcontroller 25 monitors the compare circuit 22 output for a high level which would indicate then that fluid W is no longer covering probe 14. If a delay setting 27 is enabled for a delay on break (DOB), microcontroller 25 monitors the compare circuit 22 output to be set continuously high for the time specified by the DOB setting. Upon expiration of the DOB time, microcontroller 25 then turns off transistors Q1 and Q3, which causes relay K1 to de-energize. LED D7 then illuminates when relay K1 de-energizes to visually indicate a low fluid condition.

So long as fluid W covers probe 14, microcontroller 25 monitors the compare circuit 22 output for a low level, which indicates that fluid W is covering probe 14. If a delay setting is enabled for a delay on make (DOM), microprocessor U3 monitors the compare circuit 22 output to determine if that output is continuously low for an interval of time specified by the DOM time setting. Upon expiration of the DOM time, microcontroller 25 then turns on transistors Q1 and Q3, which causes relay K1 to energize.

Compare circuit 22 contains a DIP switch S1 for setting delay on make (DON) and/or delay on break (DOB). The user may set either or both DOM and DOB switch to an "on" position for bringing about the desired DOM or DOB delay. Microcontroller 25 periodically reads these switches to determine appropriate timing operation. Preferably, microcontroller 25 may be a type PIC16C505.

In accordance with one aspect of the present invention, low water cut-off system A may be set for automatic reset or manual reset. Preferably, resistor R32 is a jumper installed to set the mode of reset to be implemented by low water cut-off system A.

If low water cut-off system A is installed for manual reset operation, then upon a low fluid condition, the user must manually press a reset switch S2 (when fluid again covers probe 14) to restore system A to normal operation. Block 28, the reset switch S2 and its associated components are only installed to provide a manual reset version of low water cut-off system A. Printed circuit board PCB may be used for both manual and automatic reset versions of low water cut-off system A.

If low water cut-off system A is installed for automatic reset, circuitry 18 is restored to normal operation immediately upon restoration of the fluid level to an extent covering probe 14.

Block 24 contains circuits that will test the functionality of the low water cut-off system electronic circuits of low water cut-off system A. A pushbutton switch shunts the AC signal, if present, from the conditioning circuits in block 22. This simulates a low fluid condition to the comparator circuit in block 22 and consequently places low water cut-off system A into a low fluid state in which relay K1 becomes de-energized and LED D7 is illuminated. The current due to the AC signal will pass through and illuminate the test LED D8. If the AC signal is not present, low water cut-off system A will already be in a low fluid condition, and the test LED, i.e, D8 will not illuminate.

Block 10 contains a power supply for low water cut-off system A. It comprises a transformer T1 and bridge circuit (diodes D1 and D3) to convert either 120 VAC or 24 VAC to 12 VDC, which is then down-regulated to provide a 5 VDC output for supplying these electronic circuits.

The signal generator, shown in block 29, uses the center taps from transformer T1. The signal generator 29 feeds two series zener diodes D9 and D10. Their outputs are capacitively coupled via C4 to the probe 14. The AC signal that capacitor C4 transmits through the probe 14 conducts into fluid W and back to block 21 if fluid W covers the electrode of probe 14.

Although the embodiment description sets forth an arrangement for introducing an AC signal and transmitting such a signal into the fluid W contained within a tank or vessel for detection by probe 14, it would be apparent to those skilled in the art that the probe 14 can itself introduce the signal and the system configured to sense whether fluid W is a sink to the signal so introduced.

Although the signal sensed by the probe may be 60 Hz or 120 Hz or some other multiple of the main power source, the system may be designed so that the signal may also be transmitted by radio frequency (RF) means of a suitable frequency, and it may also be sinusoidal or of pulse-form characteristic. In addition, the system may be designed so that other forms of signals, particularly those similarly of periodic character, such as pulses having an ultrasonic pulse repetition rate, or other sonic or ultrasonic or subsonic signals, may be used for probe 14 sensing in accordance with the general principles herein disclosed.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed is:

1. A low-water cut-off system for determining if water drops below a predetermined level within a water-containing enclosure, comprising:

a signal generator operative to introduce a signal into the water-containing enclosure such that the signal is present for sensing within water at the predetermined level, a probe at the predetermined level capable of sensing the presence of the signal within the water if the water is at the predetermined level, and a control responsive to the probe sensing for providing a control function in response to whether the signal is so sensed by the probe, in order to indicate thereby whether water has dropped below the predetermined level wherein the signal is transmitted through water in the enclosure according to the value of electrical conductivity of the water, the system including a provision for selectively adjusting the sensitivity of the probe sensing according to said value.

2. The low-water cut-off system according to claim 1 wherein the control function is an indication that water has dropped below the predetermined level, and including a circuit arrangement to selective set either a delay on make or delay on break time, or both, for indication that water has dropped below the predetermined level.

3. The low-water cut-off system according to claim 1 wherein the signal is of periodic nature.

4. A fluid-level detecting system for determining if fluid is at a predetermined level within a fluid-containing space in which fluid could be at the predetermined level, the fluid being transmissive of a signal, comprising:

signal generating circuitry capable of introducing such a signal into the fluid-containing space such that the introduced signal is present for sensing within fluid at the predetermined level if, and only if, the fluid is at least as high as the predetermined level, a probe and probe-responsive circuitry capable of sensing the presence of the introduced signal within the fluid at the predetermined level, and control circuitry capable of providing a control function in response to whether the introduced signal is so sensed, in order to indicate whether the fluid has a level is at least as high as the predetermined level wherein the signal is transmitted through fluid in the fluid-containing space according to the value of electrical conductivity of the fluid, the system including a provision for selectively adjusting the sensitivity of the probe sensing according to said value.

5. Apparatus responsive to presence of a fluid at a predetermined level within a fluid-receiving space in which the fluid can rise to the predetermined level and for providing a control function if a level of the fluid shifts from the predetermined level, comprising:

a signal generating circuitry capable of introducing a level-determining signal into the fluid-containing space such that the periodic signal is present for sensing within fluid at the predetermined level if, and only if, the fluid level is at least as high as the predetermined level, a probe and probe-responsive circuitry capable of sensing the presence of the periodic signal within the fluid at the predetermined level, and control circuitry capable of providing a control function in response to whether the level-determining signal is so sensed, in order to indicate whether the fluid has a level is at least as high as the predetermined level, whereby the control function may be used for alarm or cut-off purposes if the fluid level shifts relative to the predetermined level, wherein the signal is transmitted through fluid in the fluid-receiving space according to the value of electrical conductivity of the fluid, the system including a provision for selectively adjusting the sensitivity of the probe sensing according to said value.

6. The apparatus as set forth in claim 5, wherein the probe is configured for being inserted into the fluid-receiving space at the predetermined level.

7. The apparatus as set forth in claim 6, wherein the probe-responsive circuitry comprises a detector circuitry interconnected with the probe for receiving and determining receiving by the probe of the periodic signal.

8. The apparatus as set forth in claim 7, wherein the fluid has a transmissivity characteristic transmissivity value representing the degree of transmissivity of the periodic signal through the fluid, the detector circuitry including provision for adjusting sensitivity of the detector circuit according to said value.

9. A method for determining the presence of a fluid at a predetermined level within a fluid-receiving space in which the fluid can rise to the predetermined level, comprising:

introducing a signal into the fluid-receiving space such that the signal is present for sensing within fluid at the predetermined level, wherein said signal is transmitted through water in the fluid-receiving space according to a value of electric conductivity of the water, providing a probe at the predetermined level for sensing said signal, sensing for the presence of the signal within the fluid at the predetermined level, providing a control function in response to whether the signal is so sensed, in order to indicate whether the fluid is present at the predetermined level, and selectively adjusting the sensitivity of the probe sensing according to said value.

10. The method of electronically determining whether fluid is at a predetermined level within a fluid-receiving space, comprising:

introducing a signal into the fluid-receiving space such that the signal is present for sensing within fluid at the predetermined level, wherein said signal is transmitted through water in the fluid-receiving space according to a value of electric conductivity of the water, providing a probe at the predetermined level for sensing said signal, sensing for the presence of the signal within the fluid at the predetermined level, and providing a control function in response to whether the signal is so sensed, in order to indicate whether the fluid is or is not present at the predetermined level, and selectively adjusting the sensitivity of the probe sensing according to said value.

11. The method accord to claim 10 wherein the step of sensing for the presence of the signal is carried out by using a signal-responsive probe inserted into the fluid-receiving space at the predetermined level.

12. The method accord to claim 11 wherein the signal introduced into the fluid-receiving space is of a periodic nature.

13. The method accord to claim 12 wherein the periodic signal is coupled to the fluid in the space from a periodic signal generating circuit.

14. The method accord to claim 13 wherein the step of sensing for the presence of the signal at the predetermined level is carried out by using a detector circuit interconnected with the probe.

15. The method accord to claim 14 wherein the fluid has a characteristic having a value, subject to possible variation, which determines transmissivity of the signal through the fluid, the method further comprising adjusting sensitivity of the detector circuit according to said value.

16. The method accord to claim 15 wherein the control function is an indication that fluid is lower than said predetermined level.

17. The method accord to claim 10 wherein at least the sensing and control function providing steps are carried out under microcontroller control.

18. The method accord to claim 10 wherein the control function is an indication that fluid is lower than the predetermined level, and at least the sensing and control function providing steps are carried out by microcontroller control, and by further using microprocessor control to determine either a delay on make or delay on break time, or both, for indication that fluid is lower than said predetermined level.

* * * * *